(12) United States Patent
Lewkow

(10) Patent No.: US 9,681,052 B1
(45) Date of Patent: Jun. 13, 2017

(54) MULTI-APERTURE CAMERA WITH OPTICAL IMAGE STABILIZATION FUNCTION

(71) Applicant: Google Inc., Mountain View, CA (US)

(72) Inventor: Roman Lewkow, San Jose, CA (US)

(73) Assignee: Google Inc., Mountain View, CA (US)

( * ) Notice: Subject to any disclaimer, the term of this patent is extended or adjusted under 35 U.S.C. 154(b) by 54 days.

(21) Appl. No.: 14/598,424

(22) Filed: Jan. 16, 2015

(51) Int. Cl.
 *H04N 5/232* (2006.01)
 *G02B 27/64* (2006.01)

(52) U.S. Cl.
 CPC ....... *H04N 5/23287* (2013.01); *G02B 27/646* (2013.01); *H04N 5/23258* (2013.01)

(58) Field of Classification Search
 CPC ........... H04N 5/23287; H04N 5/23258; H04N 5/2328; H04N 5/23264; G02B 27/646; G03B 2205/0007
 See application file for complete search history.

(56) References Cited

U.S. PATENT DOCUMENTS

| | | | |
|---|---|---|---|
| 7,620,305 B2 | 11/2009 | Noji | |
| 7,714,262 B2 * | 5/2010 | Olsen | G02B 7/04 250/208.1 |
| 7,893,965 B2 | 2/2011 | Heim et al. | |
| 7,924,327 B2 * | 4/2011 | Nagashima | G02B 13/0055 348/239 |
| 8,218,032 B2 * | 7/2012 | Nagashima | G02B 13/0055 348/218.1 |
| 8,355,051 B2 | 1/2013 | Akutsu et al. | |
| 8,400,514 B2 | 3/2013 | Yagisawa | |
| 2005/0134699 A1 * | 6/2005 | Nagashima | G02B 13/0055 348/218.1 |
| 2005/0206737 A1 * | 9/2005 | Gim | G02B 27/648 348/208.11 |
| 2007/0102622 A1 * | 5/2007 | Olsen | G02B 7/04 250/208.1 |
| 2008/0029708 A1 * | 2/2008 | Olsen | G02B 7/04 250/372 |
| 2011/0128393 A1 * | 6/2011 | Tavi | H04N 5/2257 348/218.1 |
| 2011/0141309 A1 * | 6/2011 | Nagashima | G02B 13/0055 348/222.1 |

(Continued)

*Primary Examiner* — Nicholas Giles
(74) *Attorney, Agent, or Firm* — McDonnell Boehnen Hulbert & Berghoff LLP

(57) ABSTRACT

Systems and methods are described that relate to optical image stabilization in mobile computing devices that include multiple optical element sets. In an example embodiment, a mobile computing device may include a plurality of optical element assemblies, which may be coupled to a shared frame. The shared frame may be configured to maintain a fixed spatial arrangement between the optical element assemblies. A controller may receive a signal indicative of a movement of the mobile computing device. Based at least on the signal, the controller may determine a stabilization movement of the shared frame. The controller may cause an actuator to move the shared frame according to the stabilization movement. Optionally, the shared frame may also be configured to provide focus adjustments. For example, the controller may be additionally configured to cause the shared frame to move to a focus position based on a focus signal.

23 Claims, 10 Drawing Sheets

(56) References Cited

U.S. PATENT DOCUMENTS

| | | | |
|---|---|---|---|
| 2012/0099201 A1* | 4/2012 | Chan | G02B 27/646 |
| | | | 359/557 |
| 2013/0088607 A1 | 4/2013 | Akutsu et al. | |
| 2013/0182136 A1* | 7/2013 | Ishizue | G02B 13/0035 |
| | | | 348/208.11 |
| 2014/0009631 A1* | 1/2014 | Topliss | G02B 27/646 |
| | | | 348/208.11 |
| 2014/0125825 A1* | 5/2014 | Baer | H04N 5/23277 |
| | | | 348/208.5 |
| 2014/0211030 A1* | 7/2014 | Hideshima | G03B 5/00 |
| | | | 348/208.11 |
| 2015/0201128 A1* | 7/2015 | Dong | H04N 5/23287 |
| | | | 348/208.11 |

* cited by examiner

MULTI-APERTURE CAMERA WITH OPTICAL IMAGE STABILIZATION FUNCTION

BACKGROUND

Optical image stabilization provides a means to reduce the effect of camera vibration and/or movement while capturing still images and/or video with imaging devices. Specifically, conventional optical image stabilization systems may be configured to counteract motion of the imaging device by moving at least a portion of a lens set or an image sensor of the imaging device. The movement may be performed, at least in part, by actuators operable to move the respective portion of the lens set or the image sensor along a plane perpendicular to the optical axis of the imaging device.

SUMMARY

In a first aspect, a device is provided. The device includes a plurality of optical element assemblies configured to focus light. The device also includes a shared frame coupled to the plurality of optical element assemblies such that movement of the shared frame causes a corresponding movement of the plurality of optical element assemblies while maintaining a fixed spatial arrangement of the optical element assemblies. The device additionally includes at least one actuator coupled to the shared frame. The device further includes a controller configured to carry out instructions. The instructions include determining a stabilization movement of the shared frame based on a movement of the device. The stabilization movement includes a movement of the shared frame along a plane perpendicular to an optical axis of at least one of the plurality of optical element assemblies. The instructions also include causing the at least one actuator to move the shared frame according to the stabilization movement.

In a second aspect, a device is provided. The device includes a plurality of image sensors configured to sense light. The device also includes a shared frame coupled to each of the plurality of image sensors and configured to maintain the plurality of image sensors in a fixed spatial arrangement. The device additionally includes at least one actuator coupled to the shared frame. The device further includes a controller configured to carry out instructions. The instructions include determining a stabilization movement of the shared frame based on a movement of the device. The stabilization movement includes a movement of the shared frame along a focal plane of at least one of the plurality of image sensors. The instructions include causing the at least one actuator to move the shared frame according to the stabilization movement.

In a third aspect, a method is provided. The method includes determining, by a controller, a stabilization movement of a shared frame of a device based on a movement of the device. The device includes a plurality of optical element assemblies in a first fixed spatial arrangement. The plurality of optical element assemblies is configured to focus light. The device includes a plurality of image sensors in a second fixed spatial arrangement. The plurality of image sensors is configured to sense light. The shared frame is coupled to at least one of the plurality of optical element assemblies or the plurality of image sensors. The stabilization movement includes a movement of the shared frame along a plane perpendicular to an optical axis of at least one of the plurality of optical element assemblies. The method includes causing at least one actuator coupled to the shared frame to move the shared frame according to the stabilization movement.

Other aspects, embodiments, and implementations will become apparent to those of ordinary skill in the art by reading the following detailed description, with reference where appropriate to the accompanying drawings.

DETAILED DESCRIPTION

Figure 1A:
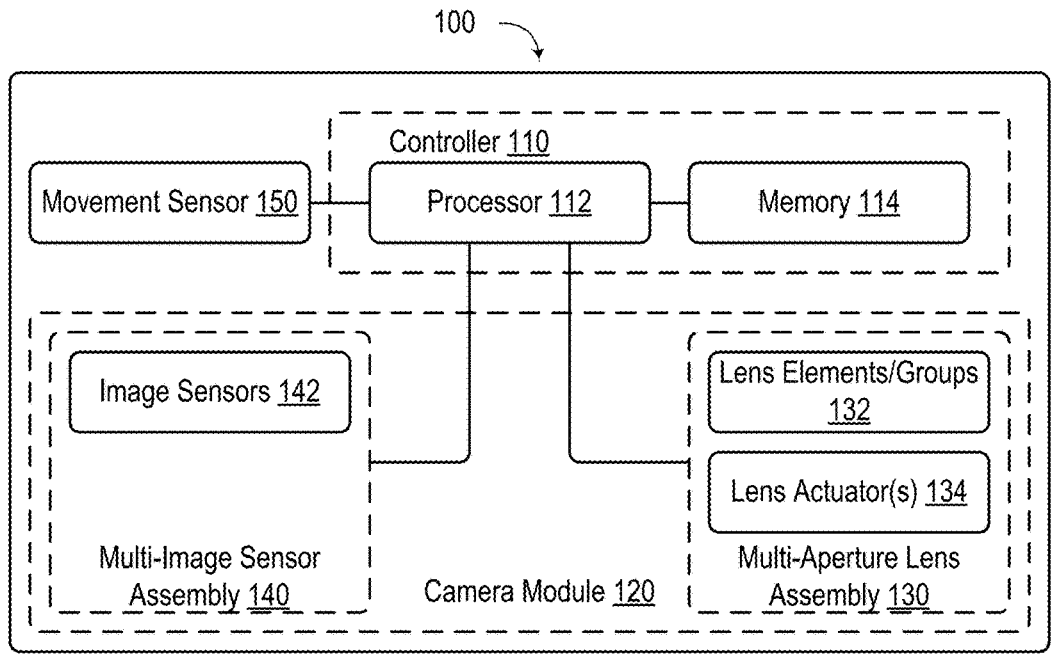
FIG. 1A illustrates a schematic diagram of a system, according to an example embodiment.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Overview

Mobile computing devices may include multiple image sensors and corresponding multiple lens sets. Such mobile computing devices may be operable to provide three-dimensional information about an environment and/or to provide an enlarged field of view of a scene. In particular, a stereo pair of image sensors, with a corresponding pair of lens sets, may be arranged at a baseline distance, which is the distance between the image sensors along a plane perpendicular to the optical axes of the image sensors.

For instance, two image sensors separated by a baseline distance may be configured to sense light and may capture respective images of the same scene. The two images may be compared with one another using a computer and depth imaging software, for example. Based on the comparison, a spatial difference between the images may provide information about the three-dimensional depth and/or distance of a particular object in the scene.

Applying conventional optical image stabilization techniques to devices with multiple image sensors and lens sets may pose challenges when the baseline distance and registration must be kept constant. For example, independent application of optical image stabilization to each image sensor and/or lens set may cause the baseline distance, or effective baseline distance, to change unexpectedly or randomly. In such a scenario, stereoscopic depth information may be unreliable or impossible to compute. Accordingly, a need exists for an improved optical image stabilization imaging system for devices with multiple image sensors and corresponding lens sets.

In an example embodiment, a device with multiple image sensors and corresponding lens sets may include a shared frame. The shared frame may physically couple the multiple lens sets so that movement of the shared frame will move the multiple lens sets in a joint manner while retaining their relative registration (which may be referred to herein as joint movement of the lens sets). The shared frame may be moved to counteract vibration and/or motion of the imaging device. In particular, the shared frame may be moved by one or more actuators configured to move the shared frame in a plane perpendicular to the optical axes of the lens sets. In other words, the multiple lens sets may be moved in concert to compensate for device vibration. Thus, the baseline distance and registration between lens sets will not change and depth information may be recovered reliably.

One or more actuators may be coupled to the shared frame. The one or more actuators may be configured to cause the shared frame to move. The one or more actuators may include an electromagnetic coil, a voice coil motor, a piezoelectric actuator, a MEMS actuator, or a shape memory alloy.

The shared frame may be operable to move along the optical axes of the lens sets in an effort to focus light onto the multiple image sensors in a similar manner. That is, the shared frame may be configured to provide a means for joint focusing via movement of the multiple image sensors. Alternatively, the shared frame may provide a mechanism for optical image stabilization and a subframe, which may be coupled to the shared frame, may provide a mechanism for joint focusing. That is, the shared frame may be physically coupled to a plurality of lens sets and be configured to maintain a particular spatial arrangement of the lens sets so as to serve as a mechanism to provide joint image stabilization. The subframe may be coupled to the shared frame and may maintain the related optical element assemblies in a particular spatial arrangement that facilitates such joint focusing.

In another embodiment, the shared frame may be coupled to a plurality of image sensors. The shared frame may be configured to maintain the plurality of the image sensors in a fixed spatial arrangement such that that movement of the shared frame will move the image sensors in a joint manner while retaining their relative registration.

In yet another embodiment, the device may include two shared frames—one coupled to the plurality of image sensors and one coupled to the plurality of optical element assemblies. Thus, the two shared frames may provide image stabilization and focusing in two joint frames.

One of skill in the art will understand that other embodiments are possible within the scope of the present disclosure. That is, other arrangements may include one or more shared frames being coupled to at least one of the multiple image sensors or the multiple lens sets. These other arrangements may enable joint movement of the image sensors and/or joint movement of the lens sets in response to camera vibration. Such other arrangements are contemplated herein.

A controller, such as a computer with a processor, may be configured to carry out instructions. The instructions may include determining a stabilization movement of the shared frame based on a movement of the device. The stabilization movement includes a movement of the shared frame along a plane perpendicular to an optical axis of at least one of the plurality of optical element assemblies. For example, if the device moves in an upward direction, the stabilization movement may be determined to be moving the shared frame downward. Furthermore, the controller may be configured to cause the at least one actuator to move the shared frame according to the stabilization movement.

System Examples

FIG. 1A illustrates a system 100, according to an embodiment. The system 100 may include a mobile computing device, such as a smartphone, a compact camera, a digital single lens reflex (dSLR) camera, a tablet, a laptop computer, a smartwatch, a robot vision system, a wearable computer, or another type of portable computer. The system 100 includes a controller 110, a camera module 120, and a movement sensor 150. The camera module 120 includes a multi-aperture lens assembly 130 and a multi-element sensor assembly 140. The controller 110 may include a processor 112 and a memory 114. The controller 110 may include one or more computing devices. For example, the controller 110 may include a distributed computing system and/or a cloud computing system. The processor 112 may include one or more microprocessors in above-mentioned computing devices.

The controller 110 may be communicatively coupled to the multi-aperture lens assembly 130. The multi-aperture lens assembly 130 may include a plurality of lens elements and/or lens groups 132. The multi-aperture lens assembly 130 may also include one or more lens actuators 134.

The one or more lens actuators 134 may include a voice coil motor, a piezoelectric actuator, a MEMS actuator, or a shape memory alloy. Other types of actuators are contemplated for the one or more lens actuators 134. Generally, any actuator configured to cause a body to move in relation to another body may be used for the lens actuator 134. The lens actuators 134 may be coupled to the lens elements and/or lens groups 132 so as to move them with respect to other elements of the system 100.

The lens elements and/or lens groups 132 may include optical elements configured to refract and/or reflect light so as to focus light and/or to form an image. Each lens element and/or lens group 132 may be disposed along an independent optical axis. For example, a given lens element and/or lens group 132 may include several lenses configured in combination to focus light along an optical axis of the given lens element and/or lens group 132. The lens elements and/or lens groups 132 may include materials substantially transparent to various wavelengths of light. For example, such optical materials may include glass, Zeonex, plastic, polycarbonate, polymethylmethacrylate, or other materials. Alternatively or additionally, the lens elements and/or lens groups 132 may include reflective materials, such as those in Cassegrain reflecting optics.

In an example embodiment, two or more lens elements and/or lens groups 132 may be disposed along two or more optical axes. The lens elements and/or lens groups 132 may be affixed to a shared frame or common housing. That is, in the case of a stereo imaging system that includes two lens elements or lens groups, both lens elements/groups would be affixed to the shared frame. In such a scenario, the lens elements and/or lens groups may be spatially fixed in relation to one another and the lens elements and/or lens groups may be configured to move with the shared frame while maintaining the fixed spatial relationship to one another.

In an example embodiment, the lens actuators 134 may include at least one magnet. The at least one magnet may be configured to provide a first magnetic field proximate to a shared frame. The actuator may also include an electromagnetic coil coupled to the shared frame. The electromagnetic coil may be configured to provide a controlled second magnetic field that interacts with the first magnetic field to cause the shared frame to move.

The controller 110 may also be communicatively coupled to the multi-image sensor assembly 140. The multi-image sensor assembly 140 may include a plurality of image sensors 142. The image sensors 142 may include focal plane arrays (FPAs) of light-sensing devices. For example, the image sensors 142 may include an array of charge-coupled devices (CCD) or complementary metal-oxide semiconductor (CMOS) devices. Each of the image sensors 142 may include an accompanying readout integrated circuit (ROIC). The ROICs may be configured to provide electrical signals based on the images captured by the image sensors 142.

In an example embodiment, the image sensors 142 may include imaging arrays configured for incorporation into mobile computing devices, such as smartphones, tablets, compact cameras, and similar electronic devices. For example, sensor sizes of ⅙" are possible. However, other sizes and types of image sensors 142 are contemplated herein. For example, larger format sensors, such as full-frame dSLR sensors or large-format digital video sensors (e.g. RED Epic Dragon) are possible. Alternatively or additionally, smaller sensors are possible (e.g. ⅛", ¹⁄₁₀", or smaller).

The image sensors 142 may be disposed on a common substrate. The image sensors 142 may be disposed at a baseline distance away from one another. In an example embodiment, the respective optical axes of the image sensors 142 may be disposed 20 millimeters apart. Other baseline distances are possible.

In an example embodiment, the device may include two sets of lens elements 132, each of which correspond to an image sensor 142. In other words, each set of lens elements 132 may share an optical axis with each image sensor 142. Alternatively, more than one set of lens elements 132 may relate to a given image sensor 142. Further, more than one image sensor 142 may relate to one set of lens elements 132. One of skill in the art will recognize that there exist many combinations of lenses and sensors configured to provide stereoscopic or multiscopic imaging. All such combinations are contemplated herein.

The controller 110 may be communicatively coupled to one or more movement sensors 150. The movement sensor 150 may include a gyroscope, an accelerometer, an inertial navigation system, a strain gauge, a piezoelectric sensor, a magnetic induction sensor, a vibration sensor, a motion sensor, a camera, a global positioning system (GPS) receiver, or any combination thereof. Other types of movement sensors 150 are contemplated.

The movement sensor 150 may be located within the camera module 120. Alternatively, the movement sensor 150 may be located elsewhere. The movement sensor 150 may be configured to provide information to the controller 110 related to a position or a displacement of the system 100. For instance, the movement sensor 150 may provide movement data related to a vibration, shock, or another type of motion of system 100. The information provided to the controller 110 may include a magnitude of a movement of the system 100 and a direction of the movement of the system 100. Alternatively or additionally, other types of information may be provided to the controller 110 from the movement sensor 150.

The processor 112 may be configured to execute instructions. The instructions may be stored in the memory 114. The instructions may include determining a stabilization movement based on a movement of the system 100. The stabilization movement includes a movement of the shared frame along a plane perpendicular to an optical axis of at least one of the lens elements/groups 132.

The stabilization movement may be based on the movement data obtained from the movement sensor 150. The stabilization movement may also take into account other information about the system 100, e.g. angle orientation of system 100, current exposure settings of system 100, whether system 100 is handheld or on a tripod, etc.

The instructions may also include causing the lens actuators 134 to move the shared frame according to the stabilization movement. In an example embodiment, moving the shared frame according to the stabilization movement may cause each of the lens elements/groups 132 to move a substantially same amount of distance in substantially the same direction.

In this disclosure, "substantial" or "substantially" may mean "close to", "approximately", "virtually", "similar", or "about". Specifically, the shared frame may cause the lens elements/groups 132 to move such that minimal relative displacement occurs so as to minimize adverse effects on image quality and stereoscopic depth calculations.

In some example embodiments, the controller 110 may be further configured to determine a focus position of the shared frame. The focus position may include, for example, a position of the shared frame along an optical axis of at least one of the lens elements and/or lens groups 132. Additionally, the controller 110 may be configured to cause at least one lens actuator 134 coupled to the shared frame to move the shared frame to the focus position. Put another way, the controller 110 may cause the lens actuators 134 to move the shared frame so as to compensate for vibration or other motion of the device as well as provide movement of the shared frame so as to provide a desired focus position for the optical system.

Figure 1B:
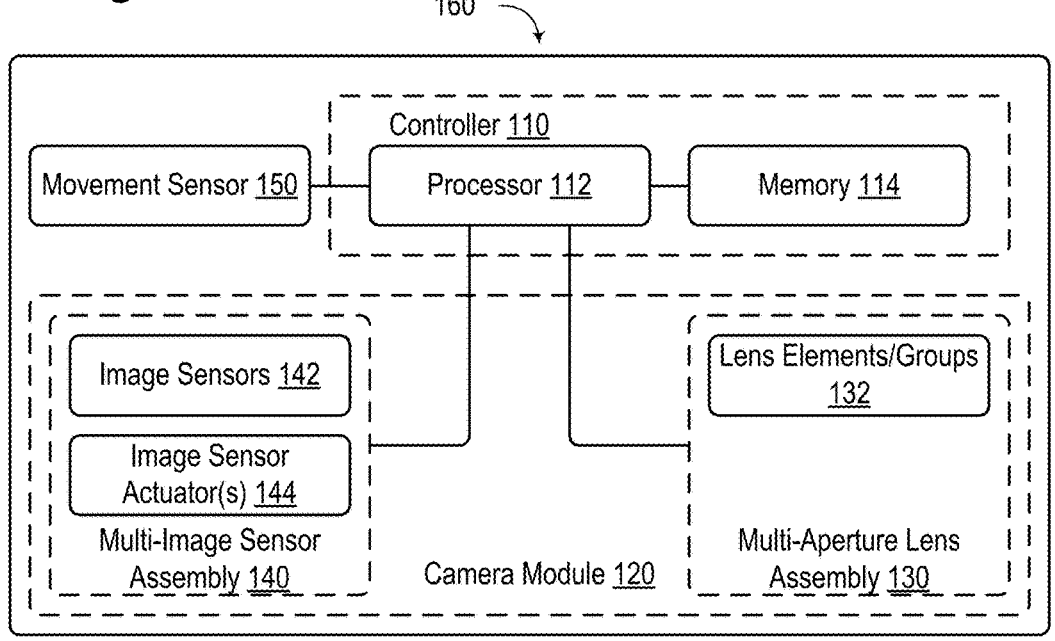
FIG. 1B illustrates a schematic diagram of a system, according to an example embodiment.

FIG. 1B illustrates a schematic diagram of a system 160, according to an example embodiment. System 160 may be similar or identical to system 100 as illustrated and described in relation to FIG. 1A. For example, system 160 may be a mobile computing device, such as a smartphone, tablet, or a wearable computing device. Other elements of system 160 may be similar to system 100.

System 160 may include one or more image sensor actuators 144. The one or more image sensor actuators 144 may include any type of actuator described herein. The one or more image sensor actuators 144 may be coupled to a common substrate upon which the image sensors 142 are disposed. The one or more image sensor actuators 144 may be configured to move the common substrate according to the stabilization movement.

In some example embodiments, the stabilization movement may include moving the image sensors 142 along a focal plane to compensate for a motion of the system 160.

Optionally, system 160 may be configured to move the image sensors 142 so as to provide a particular focus position or focus configuration. In an example embodiment, the system 160 may maintain the image sensors 142 in a fixed spatial arrangement (e.g. fixed on a common substrate or a shared image sensor frame). The fixed spatial arrangement may correspond to a position of each of the optical elements being fixed relative to the other optical elements. The controller 110 may be configured to determine a focus position of the shared image sensor frame along an optical axis of at least one of the lens elements/groups 132 and cause the at least one image sensor actuator 144 to move the shared image sensor frame to the focus position.

Figure 1C:
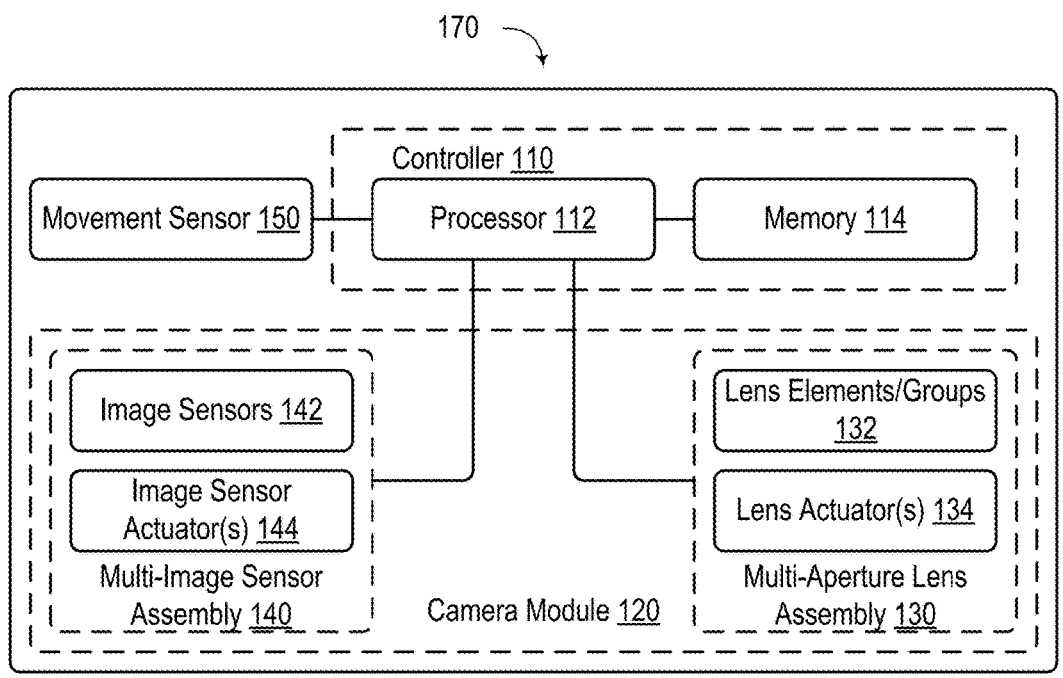
FIG. 1C illustrates a schematic diagram of a system, according to an example embodiment.

Other configurations of system 100 and system 160 are possible. For example, FIG. 1C illustrates a system 170 that includes actuators configured to move the lens elements 132 as well as actuators configured to move the image sensors 142. In such a scenario, system 170 may provide joint actuation of the lens elements 132 as well as joint actuation of the image sensors 142. Thus, system 170 may be configured to provide both a focus position of a particular lens set as well as compensate a motion of the system. Other embodiments configured to provide joint optical image stabilization and joint focusing movements are contemplated herein.

Figure 2A:
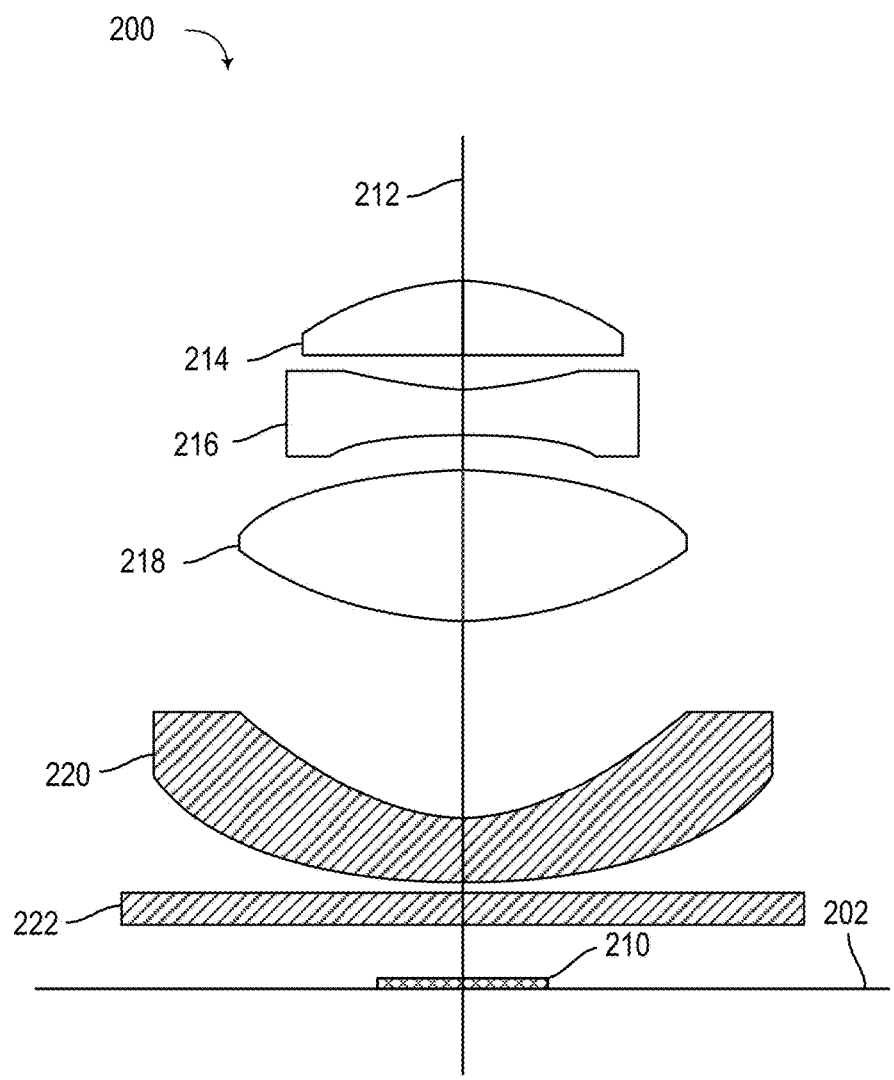
FIG. 2A illustrates a schematic diagram of a system, according to an example embodiment.
Figure 2A:
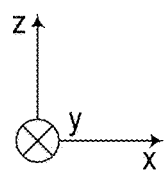

FIG. 2A illustrates a schematic diagram of a system 200, according to an example embodiment. System 200 may be illustrative of an optical system of a camera of a mobile computing device. The optical system of system 200 may be very compact. That is, the dimensions of the system 200 may be less than a cubic centimeter. Other sizes of the system 200 are possible.

System 200 may include various lens elements such as a plano-convex lens 214, a biconcave lens 216, a biconvex lens 218, a negative meniscus lens 220, and a spectral filter 222. The various lens elements may be disposed about an optical axis 212 and may be configured to work in combination to collect and focus light into an image at the image sensor 210. The various lens elements may include other types of optical components. For example, the system 200 may include aspherical, diffractive, and reflective optical elements. The image sensor 210 may be disposed on a substrate 202.

Figure 2B:
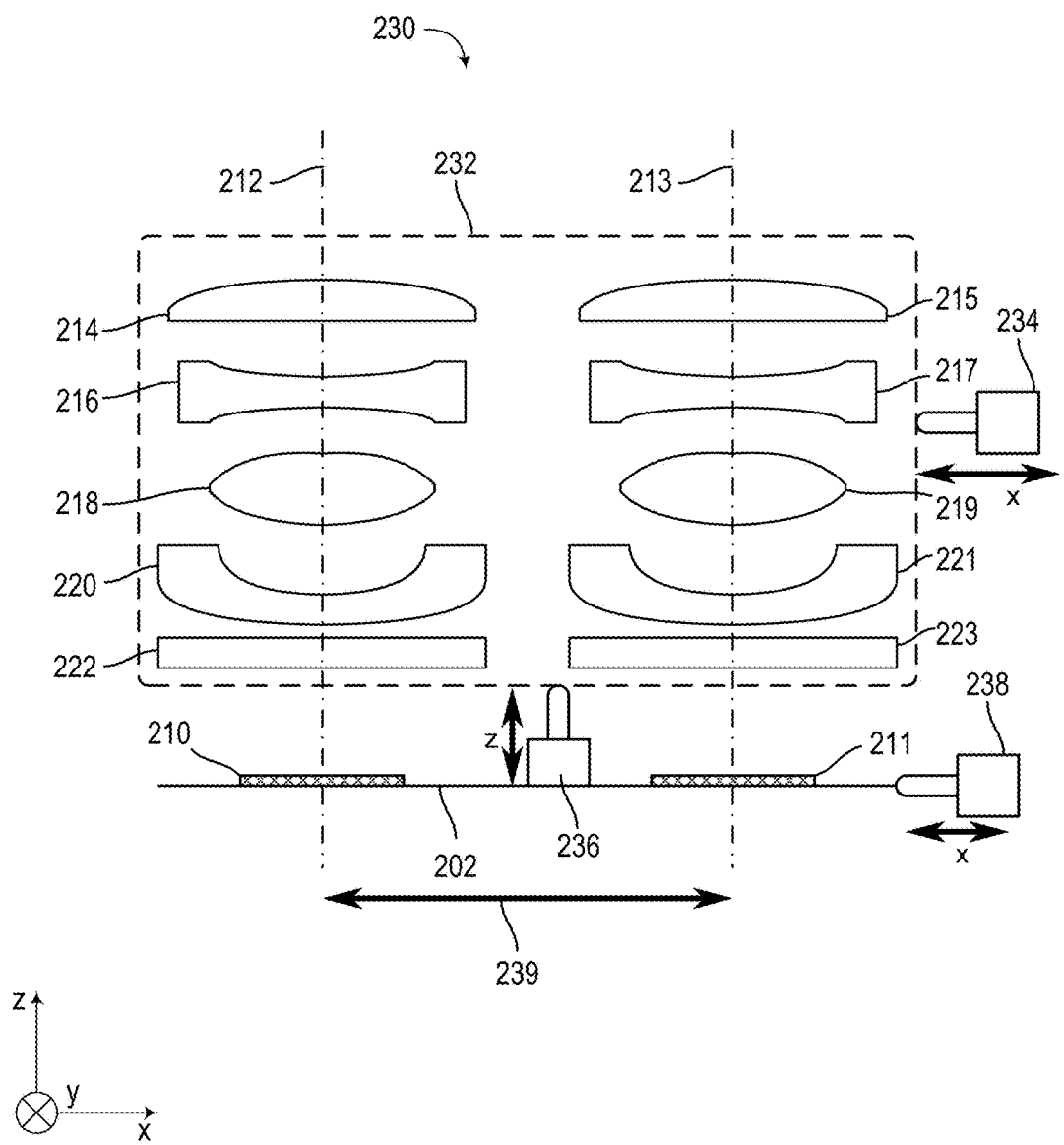
FIG. 2B illustrates a schematic diagram of a system, according to an example embodiment.

FIG. 2B illustrates a schematic diagram of a system 230, according to an example embodiment. System 230 may include similar elements to those illustrated and describe in reference to system 200 of FIG. 2A. Furthermore, system 230 may include a second optical axis 213 with a second set of optical lenses 215, 217, 219, 221, and 223. The second set of optical lenses 215, 217, 219, 221, and 223 may be physically coupled and/or fixed to a shared frame 232. System 230 may include a first image sensor 210 and second image sensor 211 disposed about optical axis 212 and optical axis 213. The first image sensor 210 and the second image sensor 211 may be disposed at a baseline distance 239 from one another. The baseline distance 239 may alternatively or additionally be described as the distance between the first axis 212 and the second axis 213.

System 230 may also include various actuators. For example, lens actuator 234 may be configured to provide a stabilization movement to the shared frame in response to a movement of the system 230. Specifically, lens actuator 234 may cause both lens sets to move jointly in the x and/or y direction. Alternatively or additionally, image sensor actuator 238 may be configured to provide a stabilization movement (in the x-direction and/or the y-direction) to the common substrate in response to a movement of the system 230.

Lens actuator 236 may be configured to provide a focus movement so as to cause the shared frame 232 to move along optical axis 212 and/or optical axis 213. In other words, lens actuator 236 may provide a requested focus position of the optical system.

Figure 2C:
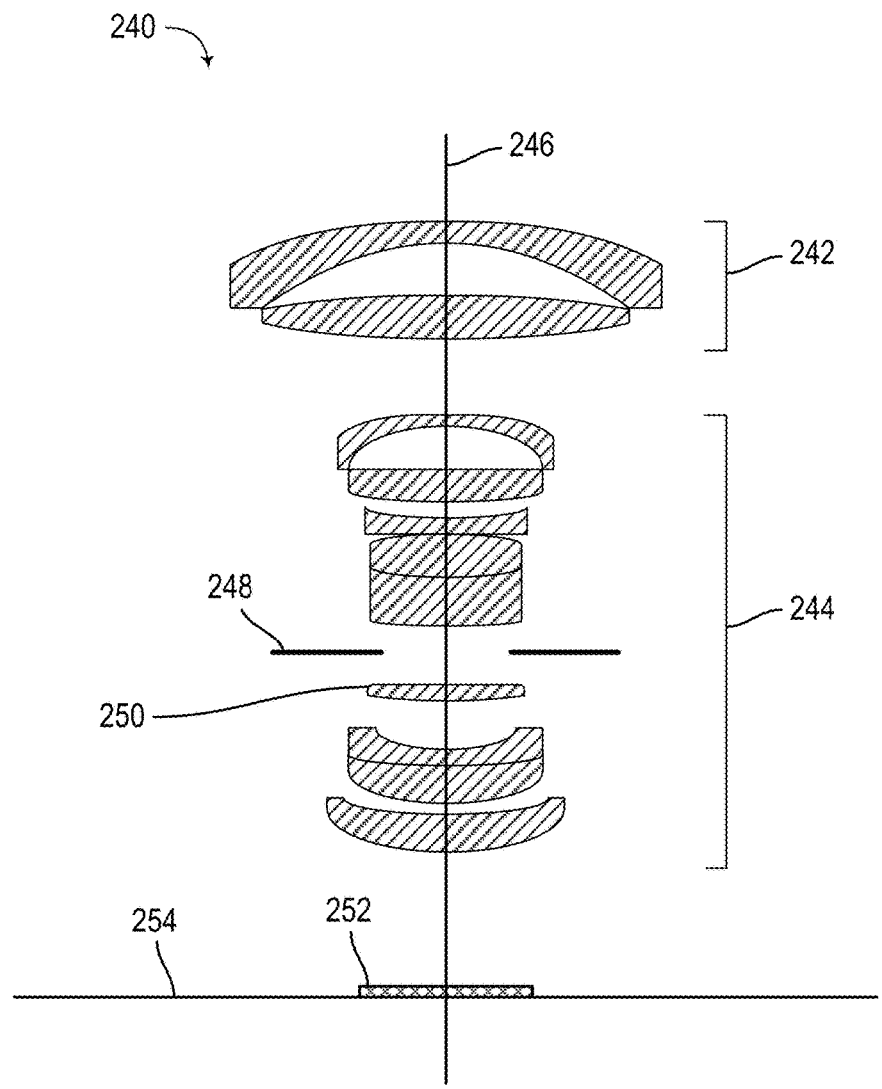
FIG. 2C illustrates a schematic diagram of a system, according to an example embodiment.

FIG. 2C illustrates a schematic diagram of a system 240, according to an example embodiment. System 240 may include an optical system typical of a dSLR or another optical system with a format larger than a camera of a mobile computing device. System 240 may include a fixed lens group 242 and a focusing lens group 244. System 240 may include an aperture 248 and an image stabilization lens element 250.

Figure 2D:
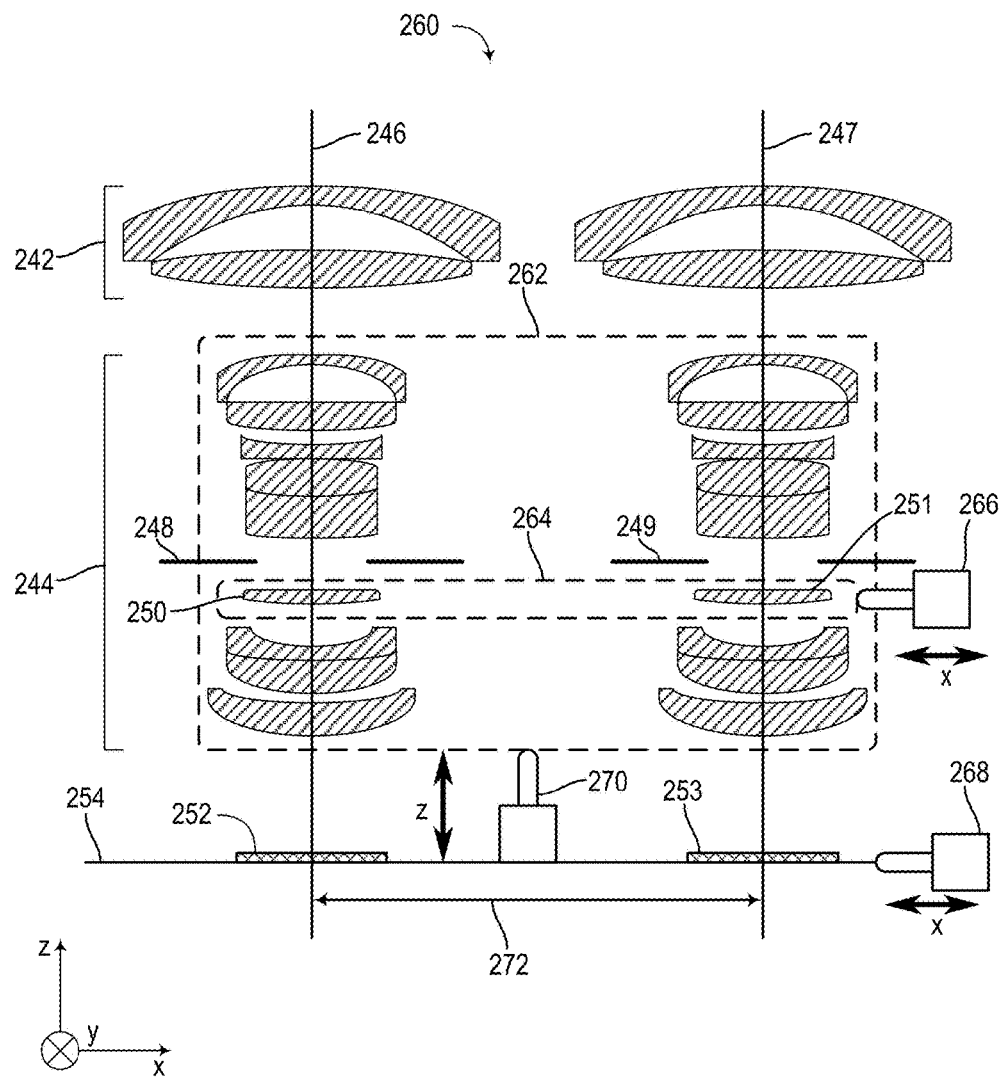
FIG. 2D illustrates a schematic diagram of a system, according to an example embodiment.

FIG. 2D illustrates a schematic diagram of a system 260, according to an example embodiment. System 260 may include elements that are identical or similar to corresponding elements in system 240 illustrated and described in reference to FIG. 2C. For example, a second set of optical elements may be disposed about a second optical axis 247. The second set of optical elements may include a second aperture 249, a second image stabilization lens element 251. The second set of optical elements may be configured to project an image onto a second image sensor 253.

System 260 also includes a shared frame 264 that may physically couple and/or fix the first image stabilization lens element 250 and the second image stabilization lens element 251. Furthermore, lens actuator 266 may be operable to move the shared frame 264 according to a stabilization movement. In other words, the first image stabilization lens element 250 and the second image stabilization lens element 251 may be moved jointly in response to a movement of the system 260 so as to reduce or eliminate imaging blur or other negative imaging effects.

Figure 3A:
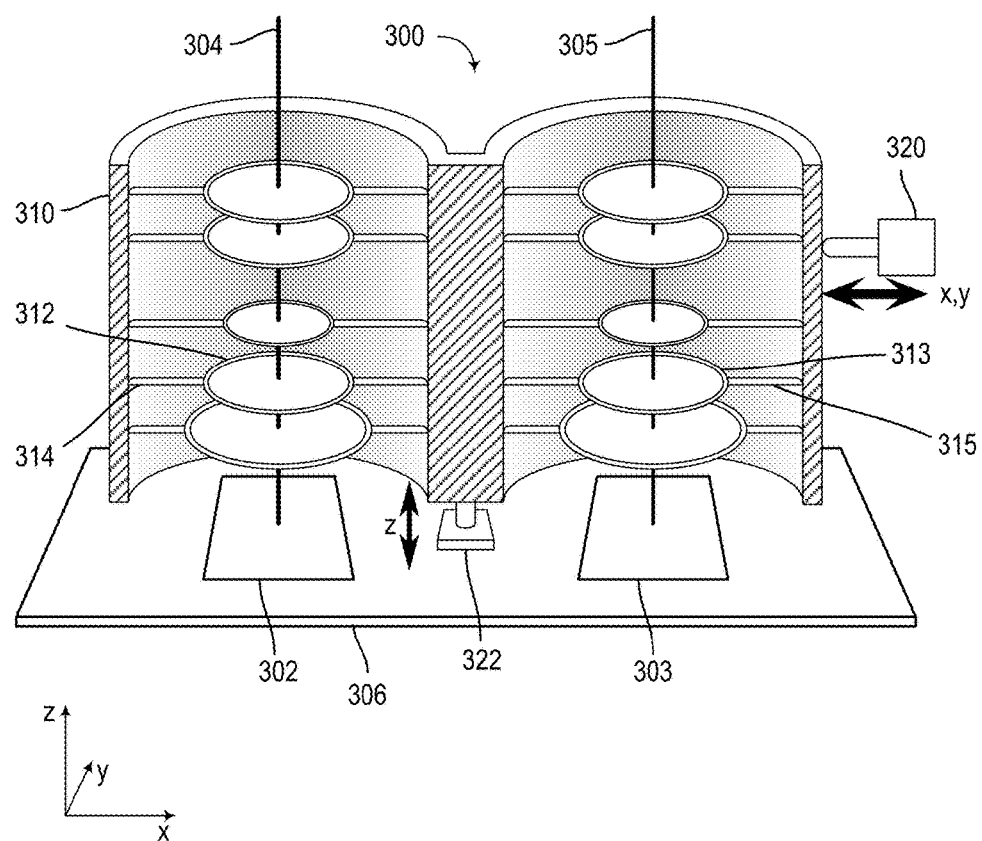
FIG. 3A illustrates a schematic diagram of a system, according to an example embodiment.

FIG. 3A illustrates a schematic diagram of a system 300, according to an example embodiment. System 300 includes a first image sensor 302 and a second image sensor 303 disposed about a first optical axis 304 and a second optical axis 305, respectively. The first image sensor 302 and the second image sensor 303 may be disposed on a common substrate 306. Alternatively, the first image sensor 302 and the second image sensor 303 need not be disposed on the common substrate 306. A first lens set 312 may be disposed about the first optical axis 304 and a second lens set 313 may be disposed about the second optical axis 305. The system 300 includes a shared frame 310 that may house, enclose, or otherwise provide support for the first lens set 312 and the second lens set 313. That is, the first lens set 312 and the second lens set 313 may be affixed to, and/or fastened within, the shared frame 310 via supports 314 and 315. The shared frame 310 may be any material and shape with sufficient rigidity to maintain a spatial relationship between the first lens set 312 and the second lens set 313. Among other examples, the shared frame 310 may include carbon fiber, ceramic, plastic, metal (e.g. aluminum, titanium, or steel), or glass, individually or in combination.

The system 300 also includes lens actuator 320 and focus actuator 322. In an example embodiment, the lens actuator 320 may be configured to move the shared frame 310 along the x-axis and/or the y-axis according to a stabilization movement. The stabilization movement may be determined by controller 110 and may include a motion of the shared frame 310 to compensate for a motion of the system 300.

In an example embodiment, the lens actuator 320 may move the shared frame 310 such that the first lens set 312 and the second lens set 313 are maintained in a fixed spatial relationship. In such a scenario, the baseline distance between the first lens set 312 and the second lens set 313 may be maintained while compensating for a motion of the system 300. Accordingly, three-dimensional depth information may be determined with higher reliability and/or better accuracy and precision.

The focus actuator 322 may be configured to move the shared frame 310 along a z-axis and/or along at least one of the first optical axis 304 or the second optical axis 305. Specifically, the focus actuator 322 may be configured to move the shared frame 310 to a focus position. The focus position may be determined by controller 110 and may relate to a position of the shared frame 310 that provides a desired focus of a scene. In an example embodiment, the lens actuator 320 and the focus actuator 322 may be controlled by the controller 110 so as to provide both image stabilization (along a plane perpendicular to the optical axes) and focus actuation (along the optical axes) while maintaining a fixed spatial relationship between the first lens set 312 and the second lens set 313.

Figure 3B:
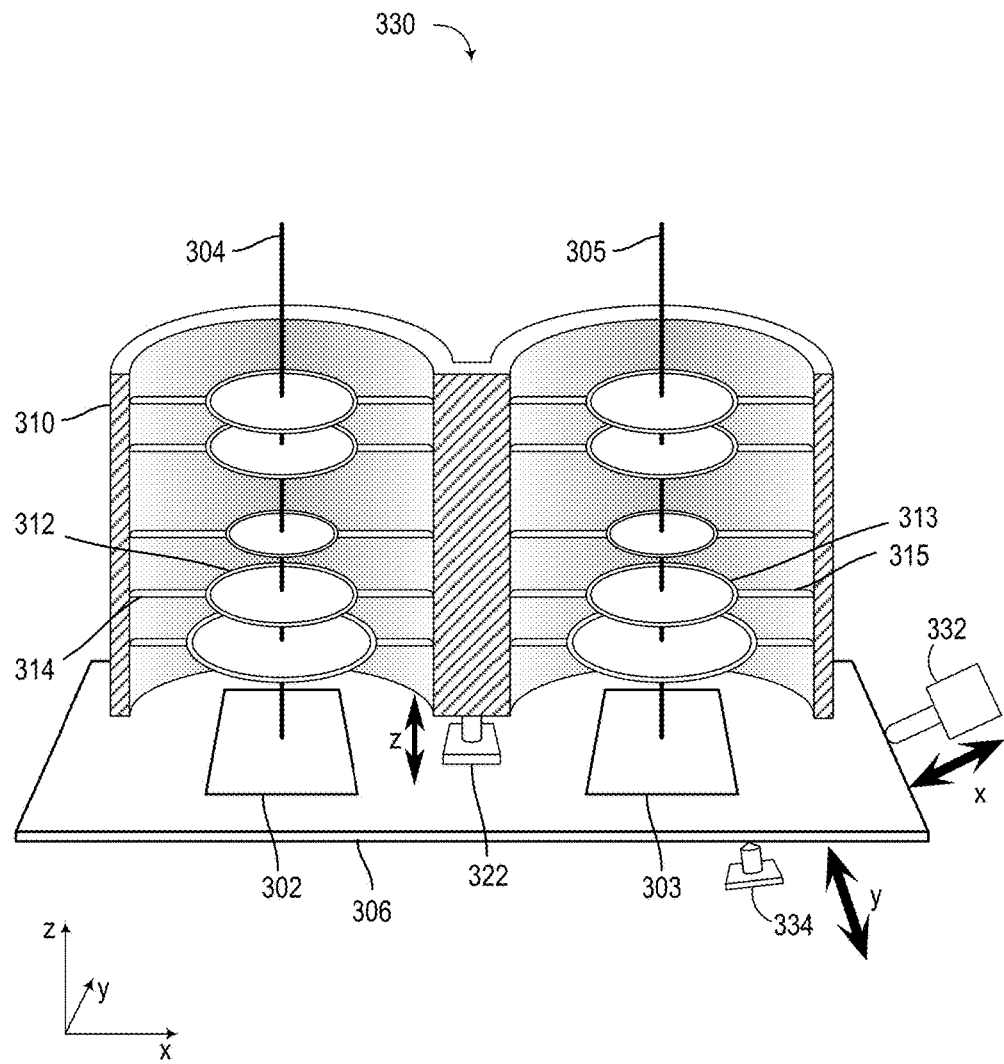
FIG. 3B illustrates a schematic diagram of a system, according to an example embodiment.

FIG. 3B illustrates a schematic diagram of a system 330, according to an example embodiment. System 330 may be similar or identical to some elements of system 300 as illustrated and described in reference to FIG. 3A. For example, system 330 may include focus actuator 322. The focus actuator 322 may be configured to provide a movement of the shared frame 310 according to a focus position, which may be determined by the controller 110.

System 330 may include an x-axis image sensor actuator 332 and a y-axis image sensor actuator 334. The x-axis image sensor actuator 332 and the y-axis image sensor actuator 334 may include any of the actuators described elsewhere herein. The x-axis image sensor actuator 332 and the y-axis image sensor actuator 334 may be configured to move the common substrate 306 according to a stabilization movement. The stabilization movement may be determined by the controller 110 based on movement information from the movement sensor 150.

In an example embodiment, the x-axis image sensor actuator 332 and the y-axis image sensor actuator 334 may provide image stabilization by moving the first image sensor 302 and the second image sensor 303 in a joint fashion while maintaining their fixed spatial relationship. Furthermore, the focus actuator 322 may be configured to move the shared frame 310 with respect to the common substrate 306 along the z-axis and/or at least one of the first optical axis 304 or the second optical axis 305. Specifically, the focus actuator 322 may move the shared frame 310 to a desired focus position, which may be determined by the controller 110.

Figure 3C:
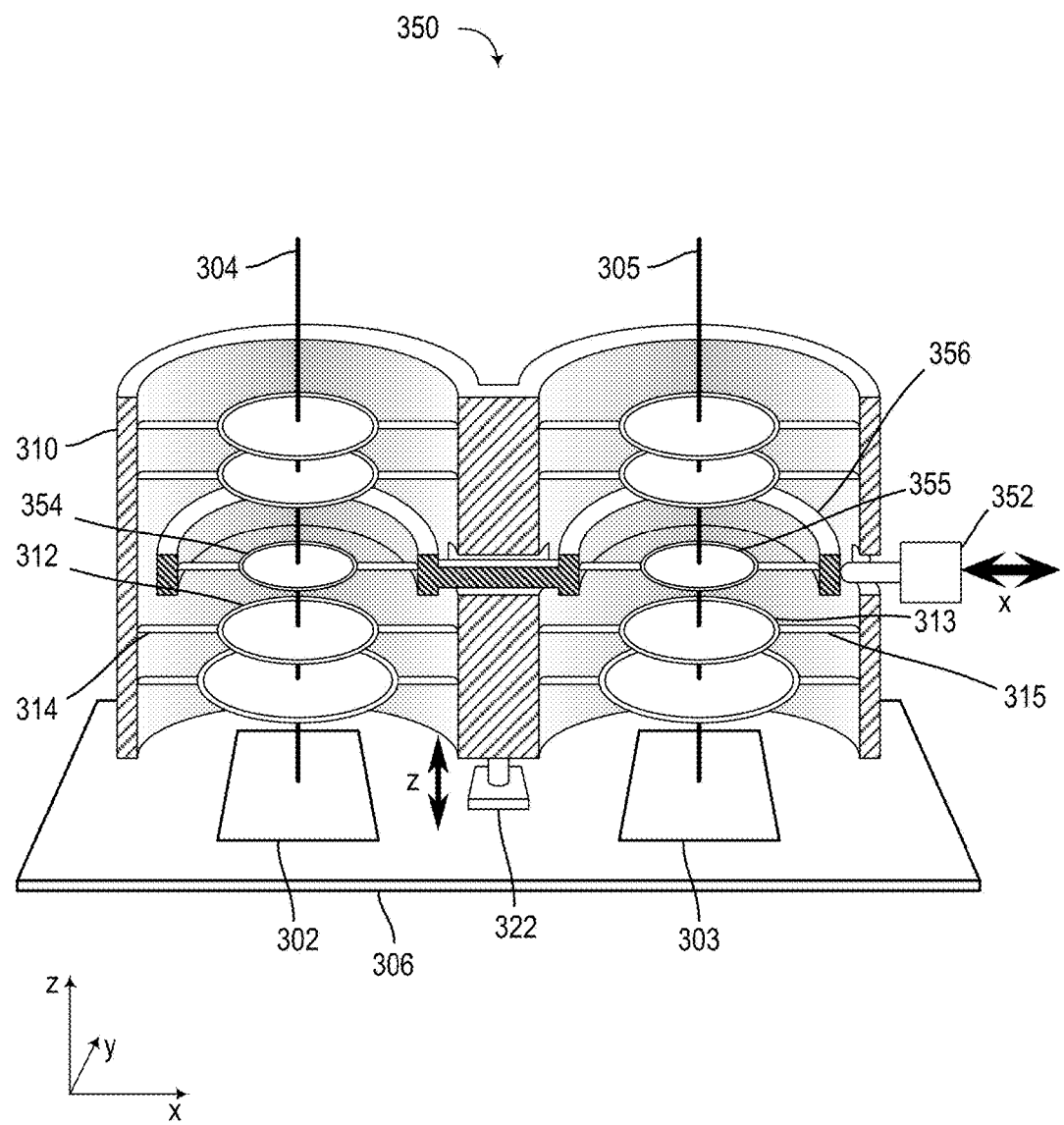
FIG. 3C illustrates a schematic diagram of a system, according to an example embodiment.

FIG. 3C illustrates a schematic diagram of a system 350, according to an example embodiment. System 350 may be similar or identical in many respects to system 300 and/or system 330, as illustrated and described in reference to FIGS. 3A and 3B, respectively. For example, the focus actuator 322 may be configured to move the first lens set 312 and the second lens set 313 along the z-axis to a desired focus position.

System 350 may also include a first image stabilization lens element 354 and a second image stabilization lens element 355. The first image stabilization lens element 354 and the second image stabilization lens element 355 may be coupled to subframe 356. Subframe 356 may be configured to maintain a fixed spatial relationship between the first image stabilization lens element 354 and a second image stabilization lens element 355.

In an example embodiment, the optical characteristics of system 350 may be configured such that moving the first image stabilization lens element 354 and the second image stabilization lens element 355 according to a stabilization movement may reduce or eliminate the effects of shaking, vibration, device movement, or other movements of system 350. As such, actuator 352 may be configured to move the subframe 356 along an x-y plane according to the stabilization movement.

Method Examples

Figure 4:
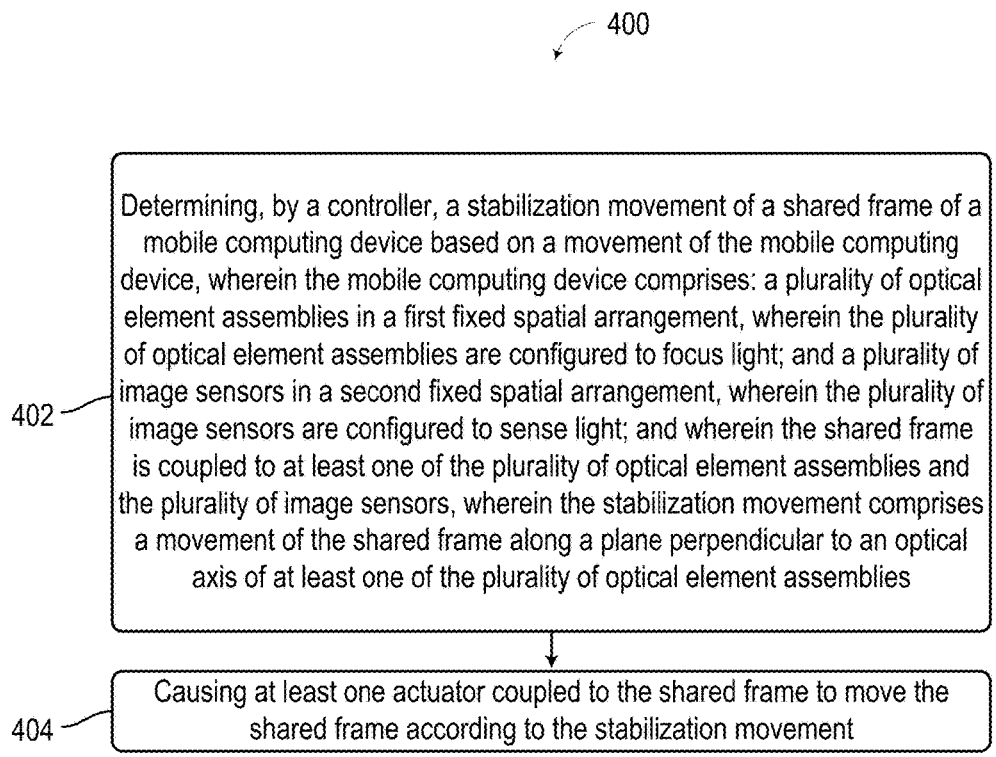
FIG. 4 illustrates a method, according to an example embodiment.

FIG. 4 illustrates a method 400, according to an example embodiment. The method 400 includes blocks that may be carried out in any order. Furthermore, various blocks may be added to or subtracted from method 400 within the intended scope of this disclosure. The method 400 may correspond to steps that may be carried out using any or all of the systems illustrated and described in reference to FIGS. 1A-1C, FIGS. 2A-2D, and FIGS. 3A-3C.

Block 402 includes determining, by a controller, a stabilization movement of a shared frame of a mobile computing device. In an example embodiment, the stabilization movement may be determined by controller 110, described in reference to FIG. 1A and FIG. 1B. The stabilization movement may be based on a movement of the mobile computing device. For instance, a movement sensor 150 may sense a movement of the mobile computing device and provide movement data to the controller 110. In response, controller 110 may determine the stabilization movement based at least on the movement data.

The mobile computing device of method 400 may be similar or identical to system 100 or system 160 as illustrated and described in reference to FIG. 1A and FIG. 1B, respectively. For example, the mobile computing device may include a plurality of optical element assemblies in a first fixed spatial arrangement. The plurality of optical element assemblies is configured to focus light. The mobile computing device also includes a plurality of image sensors in a second fixed spatial arrangement. The plurality of image sensors is configured to sense light. The shared frame is coupled to at least one of the plurality of optical element assemblies or the plurality of image sensors.

The stabilization movement may include a movement of the shared frame along a plane perpendicular to an optical axis of at least one of the plurality of optical element assemblies. That is, the stabilization movement may be determined so as to offset, reduce, and/or eliminate the optical effects of device shake, vibration, movement, or other motion-related image effects.

Block 404 includes causing at least one actuator coupled to the shared frame to move the shared frame according to the stabilization movement. As described above, the at least one actuator may be one or more of many different types of actuators. Generally, the at least one actuator may be configured to move the shared frame perpendicular to at least one of the first optical axis or the second optical axis.

Optionally, the method 400 may include determining, by the controller, a focus position of a shared image sensor frame. The focus position may include a position of the shared image sensor frame along an optical axis of at least one of the plurality of optical element assemblies. The shared image sensor frame may be coupled to the plurality of image sensors. In such a scenario, the method 400 may also include causing at least one focus actuator coupled to the shared image sensor frame to move the shared image sensor frame to the focus position.

Alternatively, the method 400 may include the shared focus frame being coupled to the plurality of optical element assemblies and the shared frame being coupled to the plurality of image sensors. As such, the method 400 may also include causing at least one focus actuator to move the shared focus frame to the focus position.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

While various examples and embodiments have been disclosed, other examples and embodiments will be apparent to those skilled in the art. The various disclosed examples and embodiments are for purposes of illustration and are not intended to be limiting, with the true scope and spirit being indicated by the following claims.

What is claimed is:

1. A device comprising:
   a shared frame coupled to a plurality of optical element assemblies such that movement of the shared frame causes a corresponding movement of the plurality of optical element assemblies while maintaining a fixed spatial arrangement of the optical element assemblies;
   a plurality of actuators coupled to the shared frame, wherein at least one actuator of the plurality of actuators is disposed between optical axes of the plurality of optical element assemblies; and
   a controller configured to carry out instructions, the instructions including:
      determining a three-dimensional stabilization movement of the shared frame in response to a movement of the device, wherein the three-dimensional stabilization movement comprises a perpendicular component and an axial component, wherein the perpendicular component comprises a movement of the shared frame along a plane perpendicular to an optical axis of at least one of the plurality of optical element assemblies, wherein the axial component comprises a movement of the shared frame parallel to an optical axis of at least one of the plurality of optical element assemblies; and
      causing the plurality of actuators to move the shared frame according to the three-dimensional stabilization movement.

2. The device of claim 1, wherein moving the shared frame according to the three-dimensional stabilization movement causes the plurality of optical element assemblies to move a substantially same amount of distance and in a substantially same direction.

3. The device of claim 1, wherein a given optical element assembly of the plurality of optical element assemblies comprises a plurality of optical elements configured to focus light along an optical axis of the given optical element assembly.

4. The device of claim 1 further comprising a sensor, wherein the sensor is configured to provide movement data to the controller based on the movement of the device and wherein determining the three-dimensional stabilization movement of the shared frame is based on the movement data.

5. The device of claim 1, wherein at least one actuator of the plurality of actuators comprises a piezoelectric actuator, MEMS actuator, or a shape memory alloy.

6. The device of claim 1, wherein the controller is further operable to:
   determine a focus position of the shared frame, based on the movement of the device, wherein the focus position comprises a position of the shared frame along an optical axis of at least one of the plurality of optical element assemblies; and
   cause at least one focus actuator coupled to the shared frame to move the shared frame to the focus position.

7. The device of claim 1, further comprising a shared image sensor frame coupled to a plurality of image sensors and at least one focus actuator coupled to the shared image sensor frame, wherein the shared image sensor frame is configured to maintain the plurality of image sensors in a second fixed spatial arrangement, wherein the plurality of image sensors are configured to sense light, and wherein the controller is further operable to:
   determine a focus position of the shared image sensor frame, based on the movement of the device, wherein the focus position comprises a position of the shared image sensor frame along an optical axis of at least one of the plurality of optical element assemblies; and
   cause the at least one focus actuator to move the shared image sensor frame to the focus position.

8. A device comprising:
   a plurality of image sensors configured to sense light;
   a shared frame coupled to the plurality of image sensors such that movement of the shared frame causes a corresponding movement of the plurality of image sensors while maintaining a fixed spatial arrangement of the plurality of image sensors a plurality of optical element assemblies;
   a plurality of actuators coupled to the shared frame, wherein at least one actuator of the plurality of actuators is disposed between optical axes of the plurality of optical element assemblies; and
   a controller configured to carry out instructions, the instructions including:
      determining a three-dimensional stabilization movement of the shared frame based on a movement of the device, wherein the three-dimensional stabilization movement comprises a first component and a second component, wherein the first component comprises a movement of the shared frame perpendicular to a focal plane of at least one of the plurality of image sensors, wherein the second component comprises a movement of the shared frame along a focal plane of at least one of the plurality of image sensors; and
      causing the plurality of actuators to move the shared frame according to the three-dimensional stabilization movement.

9. The device of claim 8, wherein the shared frame comprises a common substrate and wherein moving the common substrate according to the three-dimensional stabilization movement causes the plurality of image sensors to move a substantially same amount of distance and in a substantially same direction.

10. The device of claim 8 further comprising a sensor, wherein the sensor is configured to provide movement data to the controller based on the movement of the device and wherein determining the three-dimensional stabilization movement of the shared frame is based on the movement data.

11. The device of claim 8, wherein at least one actuator of the plurality of actuators comprises a piezoelectric actuator, MEMS actuator, or a shape memory alloy.

12. The device of claim 8, further comprising a shared focus frame coupled to the plurality of optical element assemblies and at least one focus actuator coupled to the shared focus frame, wherein the shared focus frame is configured to maintain the plurality of optical element assemblies in a second fixed spatial arrangement, wherein the plurality of optical element assemblies are configured to focus light, and wherein the controller is further operable to:
  determine a focus position of the shared focus frame, based on the movement of the device, wherein the focus position comprises a position of the shared focus frame along an optical axis of at least one of the plurality of optical element assemblies; and
  cause the at least one focus actuator to move the shared focus frame to the focus position.

13. The device of claim 8, further comprising a subframe coupled to the shared frame and at least one focus actuator coupled to the subframe, wherein the subframe is configured to maintain the plurality of optical element assemblies in a second fixed spatial arrangement, wherein the plurality of optical element assemblies are configured to focus light, and wherein the controller is further operable to:
  determine a focus position of the subframe, based on the movement of the device, wherein the focus position comprises a position of the subframe along an optical axis of at least one of the plurality of optical element assemblies; and
  cause the at least one focus actuator to move the subframe to the focus position.

14. The device of claim 8, wherein the plurality of optical element assemblies are arranged in a second fixed spatial arrangement, wherein the plurality of optical element assemblies are configured to focus light, and wherein the controller is further operable to:
  determine a focus position of the shared frame, based on the movement of the device, wherein the focus position comprises a position of the shared frame along an optical axis of at least one of the plurality of optical element assemblies; and
  cause the plurality of actuators to move the shared frame to the focus position.

15. A method comprising:
  determining, by a controller, a three-dimensional stabilization movement of a shared frame of a device based on a movement of the device, wherein the device comprises:
    a plurality of optical element assemblies in a first fixed spatial arrangement, wherein the plurality of optical element assemblies are configured to focus light; and
    a plurality of image sensors in a second fixed spatial arrangement, wherein the plurality of image sensors are configured to sense light; and
  wherein the shared frame is coupled to at least one of the plurality of optical element assemblies or the plurality of image sensors, wherein the three-dimensional stabilization movement comprises a perpendicular component and an axial component, wherein
    the perpendicular component comprises a movement of the shared frame along a plane perpendicular to an optical axis of at least one of the plurality of optical element assemblies, wherein the axial component comprises a movement of the shared frame along an optical axis of at least one of the plurality of optical element assemblies; and
  causing a plurality of actuators coupled to the shared frame to move the shared frame according to the three-dimensional stabilization movement, wherein at least one actuator of the plurality of actuators is disposed between optical axes of the plurality of optical element assemblies.

16. The method of claim 15 further comprising receiving, by the controller, movement data from a sensor, wherein the sensor is operable to provide movement data to the controller based on the movement of the device, and wherein the three-dimensional stabilization movement is determined, at least in part, based on the movement data.

17. The method of claim 15, wherein at least one actuator of the plurality of actuators comprises a piezoelectric actuator, MEMS actuator, or a shape memory alloy.

18. The method of claim 15, wherein the shared frame is coupled to the plurality of optical element assemblies.

19. The method of claim 15 further comprising:
  determining, by the controller, a focus position of the shared frame, based on the movement of the device, wherein the focus position comprises a position of the shared frame along an optical axis of at least one of the plurality of optical element assemblies; and
  causing at least one focus actuator coupled to the shared frame to move the shared frame to the focus position, wherein the shared frame is coupled to the plurality of optical element assemblies.

20. The method of claim 15 further comprising:
  determining, by the controller, a focus position of a shared image sensor frame, based on the movement of the device, wherein the focus position comprises a position of the shared image sensor frame along an optical axis of at least one of the plurality of optical element assemblies; and
  causing at least one focus actuator coupled to the shared image sensor frame to move the shared image sensor frame to the focus position, wherein the shared image sensor frame is coupled to the plurality of image sensors.

21. The method of claim 15 further comprising:
  determining, by the controller, a focus position of a shared focus frame, based on the movement of the device, wherein the focus position comprises a position of the shared focus frame along an optical axis of at least one of the plurality of optical element assemblies; and
  causing at least one focus actuator coupled to the shared focus frame to move the shared focus frame to the focus position, wherein the shared focus frame is coupled to the plurality of optical element assemblies, and wherein the shared frame is coupled to the plurality of image sensors.

22. The method of claim 15 further comprising:
  determining, by the controller, a focus position of a subframe coupled to the shared frame, based on the movement of the device, wherein the focus position comprises a position of the subframe along an optical axis of at least one of the plurality of optical element assemblies; and
  causing at least one focus actuator coupled to the subframe to move the subframe to the focus position, wherein the subframe is coupled to the plurality of optical element assemblies, and wherein the shared frame is coupled to the plurality of image sensors.

23. The method of claim 15 further comprising:
  determining, by the controller, a focus position of the shared frame, based on the movement of the device, wherein the focus position comprises a position of the shared frame along an optical axis of at least one of the plurality of optical element assemblies; and
  causing at least one actuator of the plurality of actuators coupled to the shared frame to move the shared frame to the focus position, wherein the shared frame is coupled to the plurality of image sensors.

* * * * *